May 2, 1933.  M. B. MORGAN  1,906,708
MOTOR VEHICLE
Filed April 24, 1929  5 Sheets-Sheet 2
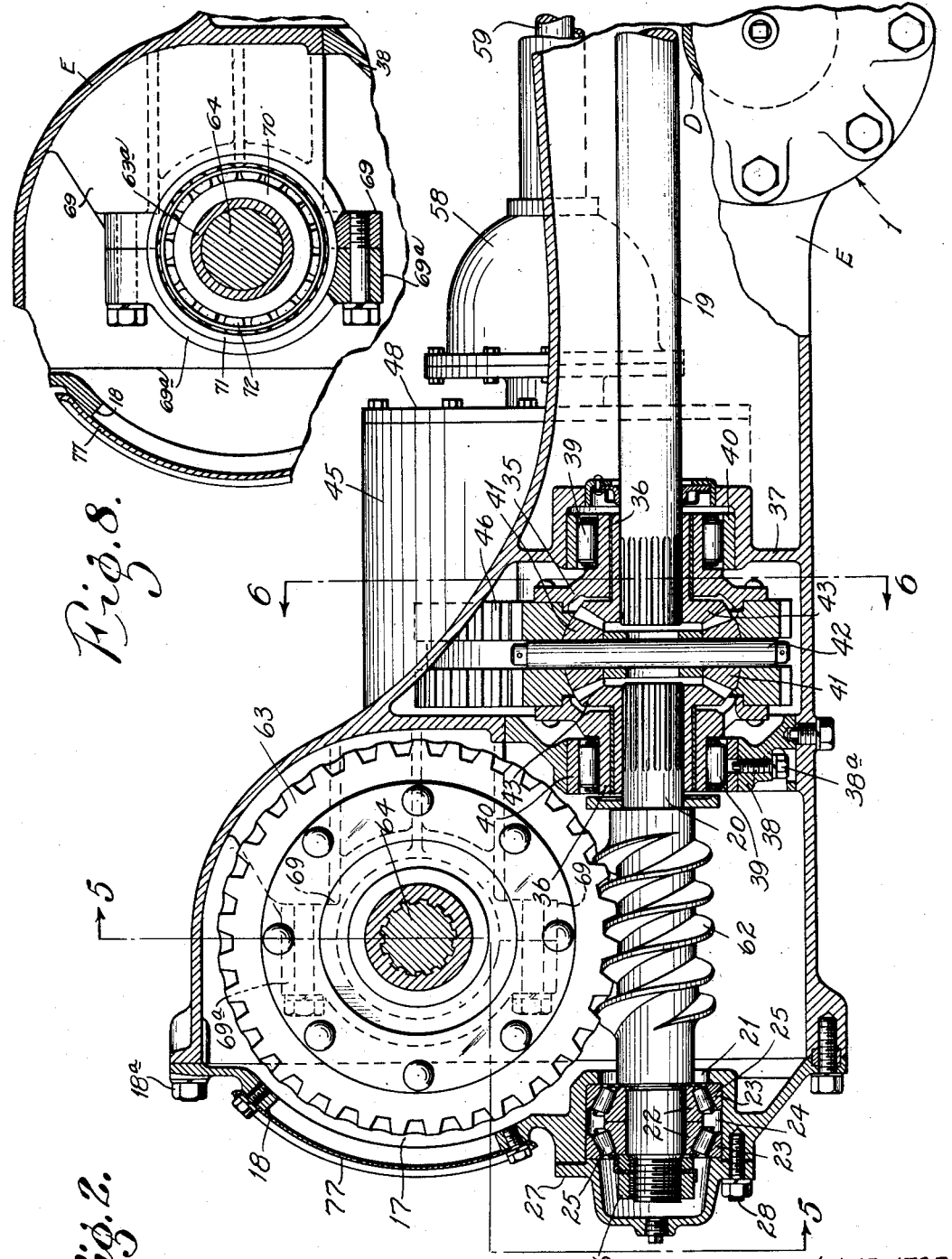

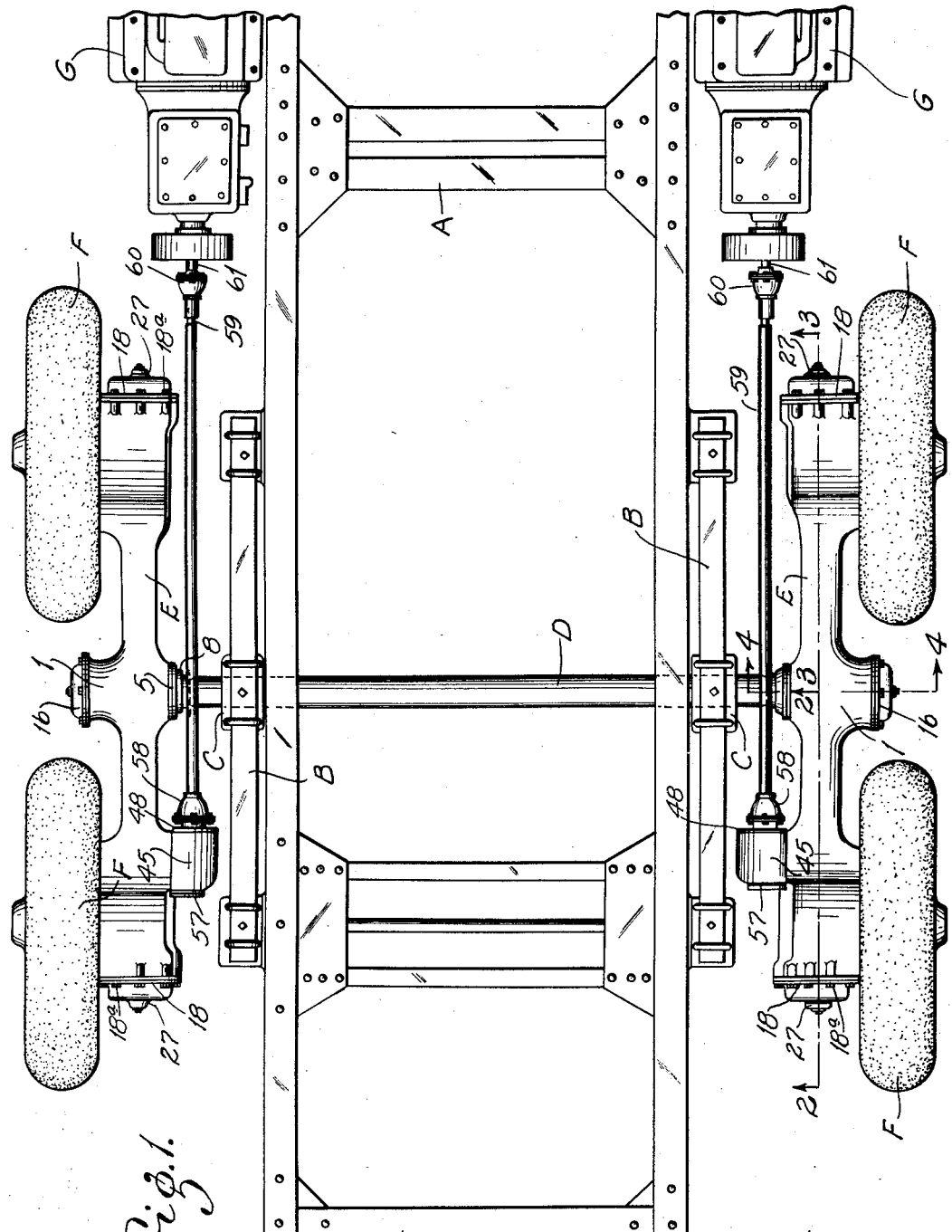

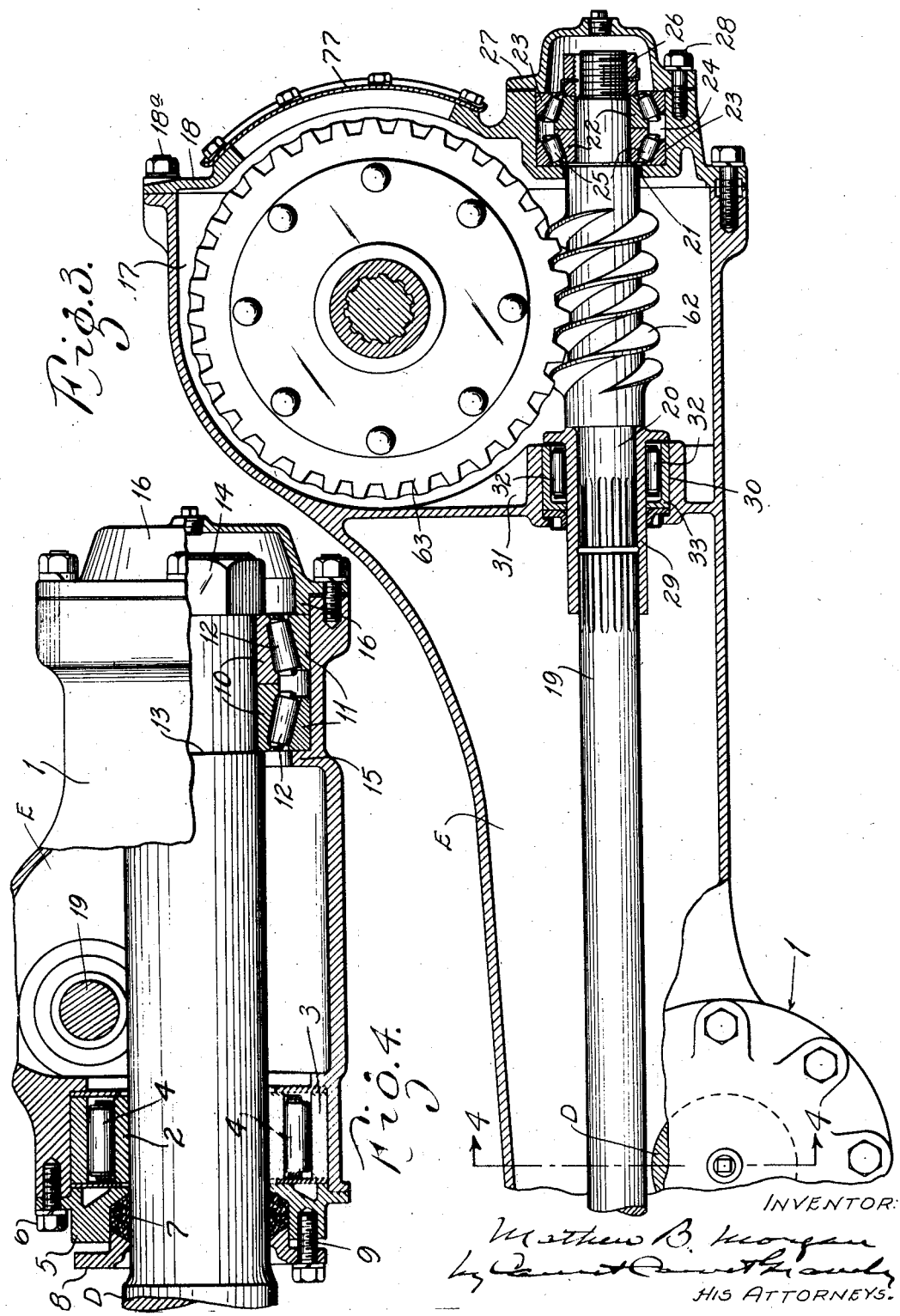

May 2, 1933. M. B. MORGAN 1,906,708
MOTOR VEHICLE
Filed April 24, 1929 5 Sheets-Sheet 4

INVENTOR
HIS ATTORNEYS.

May 2, 1933.  M. B. MORGAN  1,906,708
MOTOR VEHICLE
Filed April 24, 1929   5 Sheets-Sheet 5
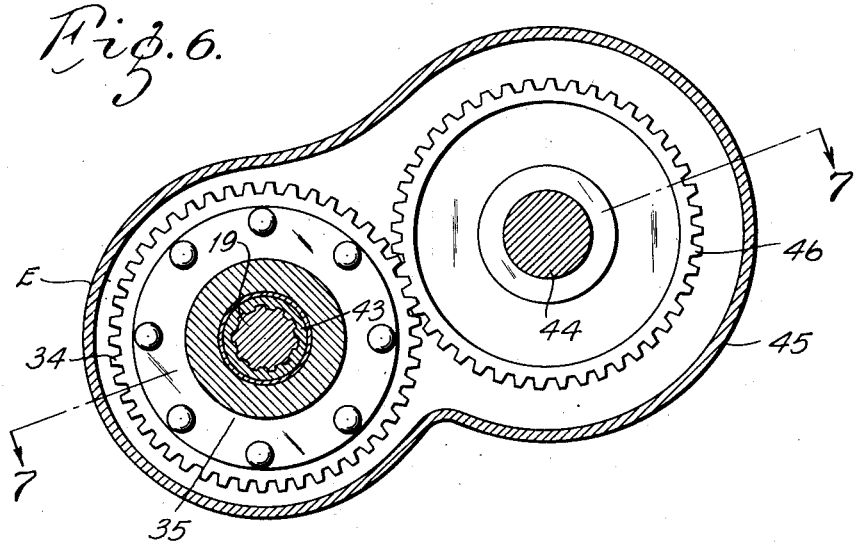
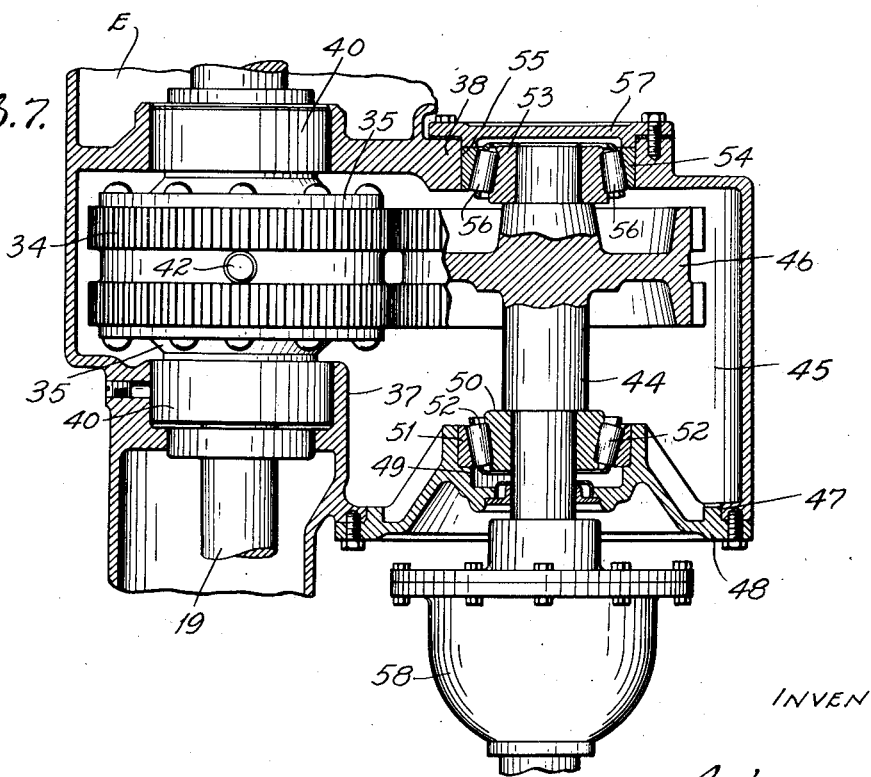

Patented May 2, 1933

1,906,708

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

MOTOR VEHICLE

Application filed April 24, 1929. Serial No. 357,658.

This invention relates to motor vehicles of the kind having four rear driving wheels arranged two on each side of the vehicle and mounted on the ends of equalizing beams which extend longitudinally of the vehicle on opposite sides thereof and are journaled intermediate their ends on a member which extends transversely of said vehicle. The invention has for its principal objects to provide hollow equalizing beams that constitute housings for the driving mechanism for the wheels carried thereby; to provide independent driving means for the wheels on each equalizing beam; to secure a differential action between the two wheels on each beam; to provide for the easy assembly of the driving mechanism in the hollow beams; and to obtain other advantages hereinafter appearing.
The invention consists in the combinations and arrangements of parts hereinafter described and claimed.

In the accompanying drawings, which form part of this specification and wherein like symbols refer to like parts wherever they occur, Fig. 1 is a plan view of the rear portion of a motor vehicle chassis provided with a driving mechanism embodying my invention;

Fig. 2 is a vertical longitudinal section through the rear end portion of one of the equalizing beams on the line 2—2 in Fig. 1;

Fig. 3 is a similar section through the front end portion of said beam on the line 3—3 in Fig. 1;

Fig. 4 is a vertical transverse cross-section through said beam along the pivotal axis thereof on the line 4—4 in Fig. 3;

Fig. 6 is a vertical cross-section through said beam, the section being taken adjacent to the differential mechanism on the line 6—6 in Fig. 2;

Figure 5:
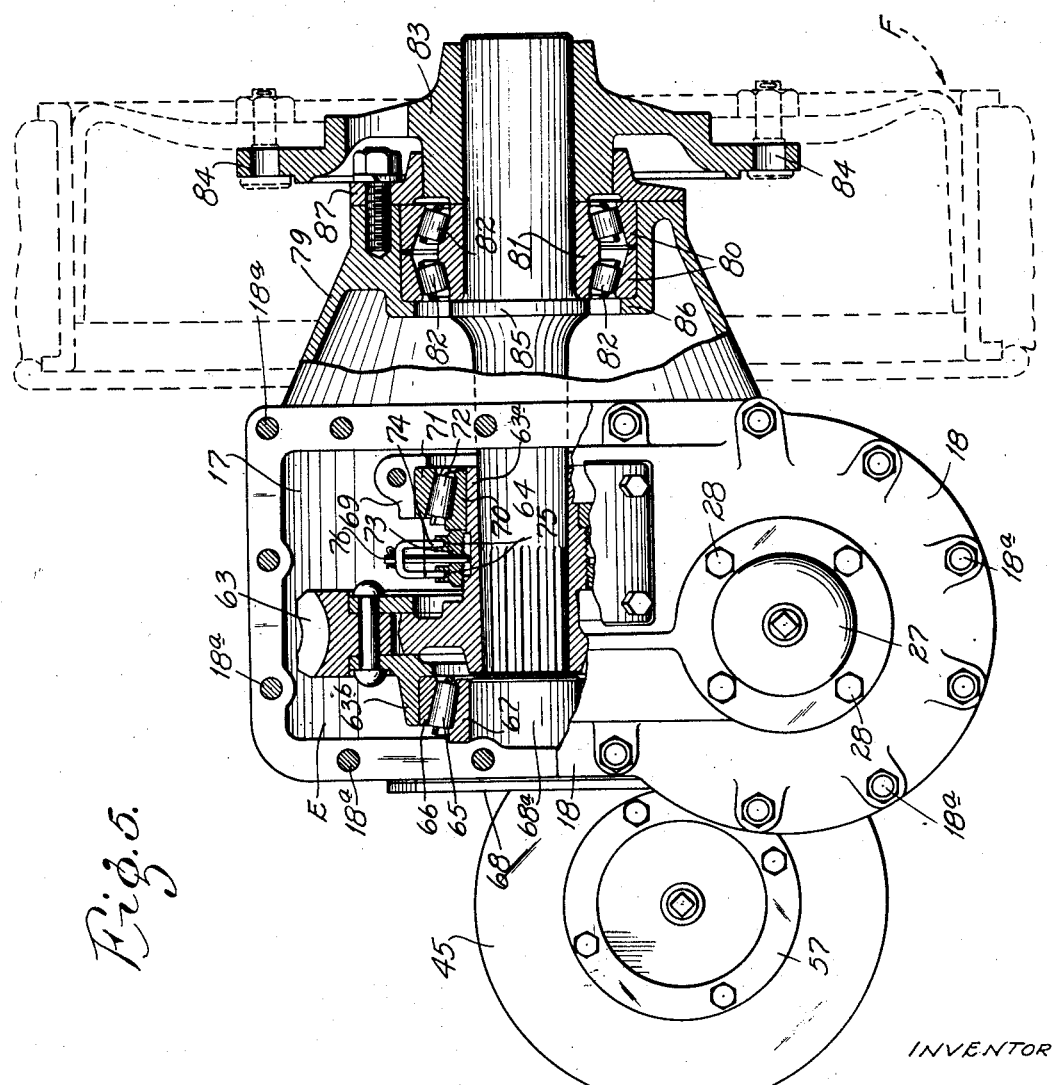
Fig. 5 is a rear end view of said beam, parts being shown in vertical cross-section on the line 5—5 in Fig. 4.

Fig. 7 is a longitudinal section through said beam in the region of the differential mechanism on the line 7—7 in Fig. 6; and Fig. 8 is a fragmentary longitudinal section similar to Fig. 2 taken adjacent to the split pedestal in which is mounted the antifriction bearing for supporting the hub of the worm gear at each end of the hollow equalizing beam.
The accompanying drawings illustrate the rear end portion of a motor vehicle chassis comprising a frame A, body supporting springs B arranged on opposite sides of said frame with their ends shackled to the side rails thereof and with their middle portions fixed to spring seats C mounted on the end portions of a cross-member or rod D that extends transversely of the vehicle beneath the frame A thereof. Each end of the cross rod D extends outwardly beyond the adjacent side rail of the vehicle frame A and has an equalizing beam E journaled thereon. Each equalizing beam E extends longitudinally of the vehicle and is pivoted midway of its ends on the cross-rod D. There are four rear driving wheels F arranged in pairs on opposite sides of the vehicle; and the two wheels on each side of the vehicle are rotatably supported at the opposite ends of the equalizing beam on that side of the vehicle. By this arrangement, the two beams E are adapted for independent rocking or oscillatory movement on the cross-rod D, thereby permitting the wheels carried on the ends of said beams to accommodate themselves to rough or uneven roads. Mounted on the vehicle frame A are two independent motors G arranged one on each side of said frame; and each motor has a driving connection with the two wheels on its side, whereby the two wheels on one side are driven by one motor, and the two wheels on the other side are independently driven by the other motor.

Each of the equalizing beams E is in the form of a hollow tubular casing or housing having an opening extending therethrough from end to end thereof and is provided midway of its ends with a transversely disposed tubular portion 1 adapted to receive the adjacent end of the cross-rod D. Interposed between the inner end of the transversely disposed tubular portion 1 of the beam is an antifriction bearing, preferably a cylindrical roller bearing. Said roller bearing comprises an inner bearing member 2, mounted on the cross-rod D, an outer bearing member 3 seated in the inner end of the tubular portion 1, and a series of cylindrical rollers 4 interposed between said inner and outer bearing members. The inner end of the tubular portion 1 of the beam is closed by means of an annular closure member 5 which is removably secured thereto by cap screws 6 and serves to retain the cylindrical roller bearing in place. Packing 7 is interposed between the annular closure member 5 and the cross-rod D and is held in place by means of a packing gland 8 that is adjustably secured by means of cap screws 9 to the outer face of said member. Interposed between the outer end of the transversely extending tubular portion 1 of each beam and the cross-rod upon which it is pivoted are two antifriction bearings, preferably conical roller bearings, each of which comprises a conical inner bearing member 10 sleeved on said cross-rod, a conical cup or outer bearing member 11 seated in said tubular portion and a series of conical roller bearings 12 interposed between said cone and cup. The cones or inner bearing members 10 of the two roller bearings are sleeved on the rod between a shoulder 13 thereof and a nut 14 on the outer end thereof with their large ends in abutting relation. The large end of the cup of the inner conical roller bearing abuts against an annular shoulder 15 provided therefor in the transversely disposed tubular portion 1 of the beam; and the large end of the cup of the outer conical roller bearing is engaged by the inwardly extending annular flange of a cap member 16 that is bolted to the outer end of said transversely disposed tubular portion and thus serves to close said end.

Each end of each beam has its end portions enlarged to form a chamber 17 at each end thereof that is closed by means of a cap or cover plate 18 that is removably secured to the end of said beam by means of cap screws 18a. Extending longitudinally of each beam from end to end thereof above the cross-rod is a sectional drive shaft comprising axially alined intermediate and end sections 19 and 20, respectively, that are inserted in and removed from said beam through the ends thereof. The outer end of each of the end shaft sections 20 extends through a bossed circular opening 21 provided therefor in the adjacent end cover plate 18 for the beam; and antifriction bearings, preferably in the form of conical roller bearings are interposed between said opening and said end of said end shaft section. As shown in the drawings, the bearings for the outer end of each end shaft section 20 comprise cones or inner bearing members 22 mounted on the end shaft section 20 with their large ends in abutting relation, conical cups or outer bearing members 23 seated in the bossed opening 24 in the cap 18, and conical bearing rollers 25 interposed between said cups and cones. The cones 22 of the two bearings are held in position on the end shaft section 20 by means of lock nuts 26 threaded on the outer end thereof; and the opening 24 in the end cap 18 is closed by means of a smaller cap 27 which is removably secured to said end cap by means of cap screws 28.

The adjacent ends of the intermediate shaft section 19 and the forward end shaft section 20 are coupled together by means of a connecting sleeve 29 having longitudinal slots or keyways forced therein to cooperate with corresponding portions on said ends of said shaft sections. Said sleeve is journaled in an antifriction bearing seated in a bossed opening 30 in a cross-web 31 of the hollow beam. Said antifriction bearing preferably comprises a series of cylindrical rollers 32 surrounding the sleeve 29 and an outer raceway member 33 seated in the bossed opening 30 in the cross-web 31 of the beam.

The adjacent ends of the intermediate shaft section 19 and the rear end shaft section 20 of each beam are connected by means of differential gearing comprising a large double spur gear 34 fixed to a housing 35 having axially alined tubular hubs 36 journaled in antifriction bearings supported in pedestals or supports 37 and 38 provided therefor in said beam. The inner bearing support 37 is made integral with the beam, and the outer bearing support 38 is removably secured within said beam by means of a cap screw 38a, thereby permitting the differential gear to be inserted in and removed from the beam through the opening in the end thereof. The antifriction bearings for rotatably supporting the hubs 36 of the differential housing 35 are shown in the form of cylindrical roller bearings comprising cylindrical rollers 39 surrounding said hub and outer raceway members 40 seated in axially alined openings in the pedestals 37 and 38. The differential mechanism also comprises differential pinions 41 journaled on a pin 42, whose ends are supported in radial openings provided therefor in the double ring gear 34, and beveled side gears 43 meshing with said differential pinions and mounted on the adjacent ends of the respective intermediate and rear end shaft sections. The side gears 43 have longitudinal slots or keyways formed in the hubs thereof to cooperate with corresponding portions on the shaft sections.

The double main gear 34 of the differential gearing, which connects the intermediate shaft section 19 and the rear end shaft section 20 of each beam, is driven from a stub or counter shaft 44 that is disposed parallel to the axes of the end and intermediate drive shaft sections and is mounted within a housing 45 formed in the inner side of the beam opposite said differential gearing. The shaft 44 has a double spur pinion 46 thereon that intermeshes with the double spur gear 34 of the differential; and said stub or pinion shaft and its pinions are removable endwise from the housing 45 through an opening 47 in the front end thereof that is closed by means of a cover plate 48. The front end of the pinion shaft 44 extends through a bossed central opening 49 in the cover plate 48 and is supported in an antifriction bearing mounted in said opening. Said bearing preferably comprises a cone 50 mounted on the shaft 44, a cup 51 mounted in the opening 47 in the closure plate 48 and conical roller bearings 52 interposed between said cup and said cone. The rear end of the pinion shaft 44 is also provided with a conical roller bearing comprising a cone 53 mounted on said shaft, a cup 54 mounted in an opening 55 provided therefor in the rear wall of the pinion shaft housing 45 and conical rollers 56 interposed between said cup and said cone. The cone 53 and rollers 56 are removable with the shaft 44 through the opening 47 in the front end of the housing 45, and the cup 54 is removable through the opening 55 in which it is supported, the opening 55 being closed by means of a removable cover plate 57 which serves to hold the cup 54 against outward movement in said opening. The forward end of the pinion shaft 44 of each beam has a suitable universal joint connection 58 with the rear end of a propeller shaft 59 whose forward end has a similar universal joint connection 60 with the transmission shaft 61 of the motor on that side of the vehicle.

Each end shaft section 20 of each beam is provided with a worm 62 which meshes with a worm gear 63 located above said worm within the chamber 17 provided therefor in the end of the beam. The worm gear 63 is splined on the inner end of a horizontally disposed stub axle or shaft 64 that extends transverse to the worm axis and is provided on its inner side face with an outstanding annular flange 63b adapted to form a seat for the cup or outer bearing member 66 of a conical roller bearing whose conical rollers 65 are interposed between said cup and an inner bearing member or cone 67 supported on the inwardly extending stud 68a of a closure member 68 that closes an opening in the inner side wall of the side beam.

The worm gear 63 has a hub 63a projecting from its outer side face that is journaled in an antifriction bearing, preferably a conical roller bearing, supported in a pedestal 69 located within the chamber 17 closed by the end cap 18. The conical roller bearing for the hub 63a of the worm gear 63 comprises a cone 70 mounted on said hub, a cup 71 seated in the pedestal 69 and a series of conical rollers 72 interposed between said cup and cone. The pedestal 69 is split on a vertical plane and provided with a cap 69a in order to permit the bearing supported therein to be inserted in and removed from the pedestal through the opening closed by the end cap 18. The roller bearing in the pedestal may be adjusted by means of an adjusting ring 73 threaded on the hub 63a of the worm gear 63 in abutting relation to the large end of the cone 70 of said bearing. The adjusting ring 73 may be locked in adjusted position by means of detents 74 that engage peripheral notches 75 in said ring and are supported on radial pins 76 whose inner ends seat in longitudinal grooves in the hub of the worm gear 63. The end cover plate 18 is provided with an opening which is closed by a cover plate 77 whereby access may be had to the bearing in the split pedestal 69 for purposes of inspection and adjustment.

The outer side wall of the side beam has a tubular portion 79 projecting therefrom; and interposed between said tubular portion and the outer end of the stub axle 64 are conical roller bearings comprising cups 80 seated in said tubular projection, a double cone 81 sleeved on said axle and two series of conical rollers 82 engaging the conical raceways of said double cone. The stub axle 64 projects outwardly beyond the outer end of the tubular projection 79 of the side beam and has a disk 83 press-fitted thereon which is provided with a circular series of holes 84 adapted to receive bolts for removably securing the body of the wheel F to said disk. The double inner bearing cone 81 for the two conical bearings for the outer end of the stub axle 64 is located between a shoulder 85 on said axle and the inner end of the hub of the disk 83; and the cups 80 of said bearings are held between an annular shoulder 86 in the tubular projection 79 and the inner face of an annular member 87 that is screwed or otherwise removably secured to the end face of said tubular projection.

The foregoing construction has numerous advantages. The equalizing beams E, which support the rear driving wheels F, are adapted for independent oscillatory movement on the cross-rod D, thereby permitting said wheels to accommodate themselves to rough or uneven roads. The two wheels carried by the beam on one side of the vehicle are driven by one motor and the two wheels carried by the beam on the other side of the vehicle are independently driven by the other motor; and the two wheels carried by each beam are differentially driven. The entire driving mechanism for the two wheels of each beam is completely enclosed within the beam, and the entire mechanism or parts thereof can be readily inserted in and removed from said beam through the openings at the ends thereof. The stub axles can be quickly and easily mounted on and dismounted from the beams without disturbing any other part of the driving mechanism; and the beam with the wheels mounted thereon and the driving mechanism enclosed therein can be readily attached to and removed from the cross-rod as a complete unit.

Obviously, the hereinbefore described invention admits of considerable modification without departing from the invention; therefore, I do not wish to be limited to the precise construction shown and described.

What I claim is:

1. In a motor vehicle having a cross-member, a hollow equalizing beam journaled on each end of said cross-member, a wheel journaled on each end of said equalizing beam, axially alined driving shaft sections journaled in said beam, and driving connections between said sections and the respective wheels, differential gearing connecting the adjacent ends of said sections, in combination with a pinion shaft journaled in said beam alongside of said differential gear and having a pinion meshing therewith, said beam having an opening in alinement with said pinion shaft and adapted to permit said pinion shaft and pinion to be inserted in and removed from said beam independently of said differential gear and the shaft sections connected thereby, a bearing for rotatably supporting said pinion shaft, and a cap for closing said opening and for supporting the bearing for said pinion shaft, whereby said cap and bearing are adapted to be attached to and removed from said beam as a unit.

2. In a motor vehicle having a cross-member, a hollow equalizing beam journaled on said cross-member and having openings in its ends, caps for closing said openings, a driving shaft mounted in said beam and extending endwise thereof, a stub axle mounted in each end of said beam and extending crosswise thereof, a wheel fixed to said stub axle, and a driving connection between said driving shaft and said stub axle including a gear fixed to the latter, in combination with an antifriction bearing for rotatably supporting said stub axle, and a split pedestal inside of said hollow equalizing beam for supporting said antifriction bearing, said pedestal comprising a main body portion rigid with said hollow equalizing beam and a cap, and said antifriction bearing being adapted to be inserted in and removed from said beam through the opening in the end thereof.

Signed at Detroit, Michigan, this 17th day of April 1929.

MATHEW B. MORGAN.